United States Patent
Pires (10) Patent No.: US 11,642,910 B2
(45) Date of Patent: May 9, 2023

(54) REVERSIBLE TRAY APPARATUS

(71) Applicant: AdoraBlue LLC, New York, NY (US)

(72) Inventor: Luciana Pires, New York, NY (US)

(73) Assignee: AdoraBlue LLC, New York, NY (US)

( * ) Notice: Subject to any disclaimer, the term of this patent is extended or adjusted under 35 U.S.C. 154(b) by 1037 days.

(21) Appl. No.: 16/405,885

(22) Filed: May 7, 2019

(65) Prior Publication Data

US 2020/0353772 A1 Nov. 12, 2020

(51) Int. Cl.

| B43L 1/00 | (2006.01) |
|---|---|
| A47D 3/00 | (2006.01) |
| A47D 15/00 | (2006.01) |
| A47B 23/00 | (2006.01) |
| A47B 27/00 | (2006.01) |
| B60N 3/00 | (2006.01) |

(52) U.S. Cl.
CPC .............. *B43L 1/00* (2013.01); *A47B 23/001* (2013.01); *A47B 23/002* (2013.01); *A47B 27/00* (2013.01); *A47D 3/00* (2013.01); *A47D 15/00* (2013.01); *B60N 3/002* (2013.01)

(58) Field of Classification Search
CPC ....... B43L 1/00; A47B 23/001; A47B 23/002; A47B 27/00
USPC ......................................................... 434/408
See application file for complete search history.

(56) References Cited

U.S. PATENT DOCUMENTS

| 4,770,107 A | 9/1988 | Miller |
| 5,671,479 A | 9/1997 | Dedrick |
| 6,116,166 A | 9/2000 | Rotstein |
| 6,679,188 B1 | 1/2004 | Spagnoli, Jr. |
| D550,477 S | 9/2007 | Probst |
| 7,658,153 B1 | 2/2010 | Patoka |
| 8,091,486 B1 * | 1/2012 | Broaddrick .......... A47B 23/002 |
| | | 248/444 |
| D781,062 S * | 3/2017 | Probst .......................... D6/406.5 |
| D785,361 S * | 5/2017 | Salisbury .................... D6/406.5 |
| D795,789 S * | 8/2017 | Ehtesham .................... D12/425 |
| D924,782 S * | 7/2021 | MacFarlane ................. D12/416 |
| D930,385 S * | 9/2021 | Huang .......................... D6/406.3 |

(Continued)

OTHER PUBLICATIONS

Amazon.com [online], "Innokids Kids Travel Lap Tray Children Car Seat Activity Snack and Play Tray Desk with Erasable Surface, iPad & Tablet Holder, Detachable Organizers for Cars, Planes & Baby Stroller (Gray)," Oct. 2018, [retrieved on Jan. 17, 2019], retrieved from: URL<https://www.amazon.com/dp/B07GP8CQRT/ref=sspa_dk_detail_7?pd_rd_i=B07GP8CQRT&pd_rd_w=rSeMP&pf_rd_p=21517efd-b385-405b-a405-9a37af61b5b4&pd_rd_wg=ydS2H&pf_rd_i=YPVR35CWVK3A295VRNWX&pd_rd_r=663c2a11-0606-11e9-b40e-45b207f2ee03&th=1>, 6 pages.

(Continued)

*Primary Examiner* — Daniel J Troy
*Assistant Examiner* — Timothy M Ayres
(74) *Attorney, Agent, or Firm* — Fish & Richardson P.C.

(57) ABSTRACT

An apparatus includes a reversible tray. The reversible tray includes a first surface including a marking board. The reversible tray is configured to be used in a first configuration in which the first surface faces in a particular direction. A second surface is on a reverse side of the reversible tray and includes a padding. The reversible tray is further configured to be used in a second configuration in which the second surface faces in the particular direction. A pouch is attached to the reversible tray. The pouch is configured to receive and secure an object to the reversible tray.

20 Claims, 6 Drawing Sheets

(56) References Cited

U.S. PATENT DOCUMENTS

| | | | |
|---|---|---|---|
| D943,496 S * | 2/2022 | Brumby | D12/425 |
| 2005/0092212 A1 | 5/2005 | Simon | |
| 2007/0029848 A1 | 2/2007 | Probst | |
| 2009/0140023 A1 | 6/2009 | Noble | |
| 2012/0020586 A1 | 1/2012 | Gilbert | |
| 2018/0043809 A1 * | 2/2018 | Probst | B60N 3/002 |

OTHER PUBLICATIONS

Amazon.com [online], "Kids Travel Play Tray-Perfect Car Seat Travel Tray and Accessories for Airplane Activities for Kids, Keep Toddlers Occupied for Hours, Anti-Bacteria Coating Surface, Sturdiest & Most Comfortable Tray," Oct. 2017, [retrieved on Jan. 17, 2019], retrieved from: URL<https://www.amazon.com/Kids-Travel-Play-Tray-Anti-Bacteria/dp/B06XZXVQXC/ref=sr_1_6_s_it?s=baby-products&ie=UTF8&&qid=1545495708&sr=1-6&keywords=car+seat+travel+tray&th=1>, 8 pages.

Amazon.com [online], "Kids Travel Tray—Sturdy Dry Erase Top with Detachable Tablet ipad Holder—Child Play and Snack Lap Tray Table—Toddler Activities for Car Seat, Stroller, and Plane by Practico Kids," Aug. 2018, [retrieved on Jan. 17, 2019], retrieved from: URL<https://www.amazon.com/dp/B07DGL74FX/ref=sspa_dk_detail_4?psc=1&pd_rd_i=B07DGL74FX&pd_rd_w=rSeMP&pf_rd_p=21517efd-b385-405b-a405-9a37af61b5b4&pd_rd_wg=ydS2H&pf_rd_r=YPVR35CWVK3A295VRNWX&pd_rd_r=663c2a11-0606-11e9-b40e-45b20712ee03>, 7 pages.

Amazon.com [online], "Kids Travel Tray for Toddler Car Seat | Toddler Car Seat Tray Organizer | Large ipad Holder A Road Trip Essential Soft Padding, Waterproof, Food & Snack Lap Tray Carseat, Stroller, and High Chair," Nov. 2018, [retrieved on Jan. 17, 2019], retrieved from: URL<https://www.amazon.com/Toddler-Organizer-Essential-Waterproof-Stroller/dp/B07FTNL5PK/ref=sr_1_16_s_it?s=baby-products&ie=UTF8&qid=1545495809&sr=1-16&keywords=car+seat+travel+tray>, 7 pages.

Amazon.com [online], "Kids Travel Tray Soft Car Lap Desk—Bonus Pencil Case—Portable Table for Activities and Eating Snacks—Durable Waterproof as Carrying Bag or Backpack—Fits Toddler Carseat or Booster Seat," Jul. 2017, [retrieved on Jan. 17, 2019], retrieved from: URL<https://www.amazon.com/Portable-Activities-Waterproof-Carrying-Backpack/dp/B01N6FYCQX>, 7 pages.

Amazon.com [online], "Smart Travel Tray—Ideal as Kids Travel Tray—Toddler Travel Tray & Baby Stroller Tray—Travel Activity Tray & Play Tray—Baby Snack Tray & Kid's Car Seat Tray—Play Table," Nov. 2017, [retrieved on Jan. 17, 2019], retrieved from: URL<https://www.amazon.com/Smart-Travel-Tray-Stroller-Activity/dp/B07G349PL6/ref=sr_1_20_s_it?s=baby-products&ie=UTF8&qid=1545495809&sr=1-20&keywords=car+seat+travel+tray>, 8 pages.

Amazon.com [online], "Standable Travel Tray for Kids Extra Sturdy—Plane/Car Seat Play Tray for Your Toddler-Portable, Multi-Use Lap Desk -w/White Board, Car Entertainment Table, Bonus Activity Sheets and 5 Markers," Oct. 2018, [retrieved on Jan. 17, 2019], retrieved from: URL<https://www.amazon.com/Standable-Travel-Tray-Extra-Sturdy/dp/B07FZN29RK/ref=sr_1_3?keywords=Travel+Tray+Lap+Desk+for+Kids&qid=1555088358&s=gateway&sr=8-3>, 7 pages.

Amazon.com [online], "Travel Tray for Car Seat Includes USB Charging Port | Tablet Holder | Perfect for Car Seats | Airplanes Big Pockets for Travel Essentials | Kids Lap Play Trays for Activities, Snacks, Toys, Coloring," Dec. 2018, [retrieved on Jan. 17, 2019], retrieved from URL: <https://www.amazon.com/dp/B07H53RQGL/ref=sxbs_sxwds-stvpv2_3_s_it?pf_rd_p=6375e697-f226-4dbd-a63a-5ec697811ee1&pd_rd_wg=DwwLk&pf_rd_r=GCPSW4BC3NH5FG8S77AY&pd_rd_i=B07H53RQGL&pd_rd_w-wdI5Z&pd_rd_r=831ef84e-a5d6-4e53-ac7e-23080586982d&ie=UTF8&qid=1545496421&sr=3>, 7 pages.

Amazon.Com, "Travel Tray Lap Desk for Kids: Car Seat Organizer Trays for Toddles Activities," Sam On The Go, Jul. 2017, [retrieved on Jan. 17, 2019], 7 pages.

* cited by examiner

REVERSIBLE TRAY APPARATUS

TECHNICAL FIELD

This description relates generally to a tray apparatus, for example, to a reversible tray apparatus including a marking board and a padded surface.

BACKGROUND

A parent or care provider who is caring for a disabled adult or child at home may be required to perform a task while the disabled adult or child is sitting on a chair, bench, or bed. Moreover, families with young children often travel on vacation using automobiles. Children may therefore be required to be engaged and entertained while a parent or care provider is performing a task or driving. A child who is sitting for a period of time may become bored, cranky, or emotional.

SUMMARY

A reversible tray apparatus is disclosed. In some embodiments, the apparatus includes a reversible tray including a first surface including a marking board. The reversible tray is configured to be used in a first configuration in which the first surface faces in a particular direction. A second surface is on a reverse side of the reversible tray and includes a padding. The reversible tray is further configured to be used in a second configuration in which the second surface faces in the particular direction. A pouch is attached to the reversible tray. The pouch is configured to receive and secure an object to the reversible tray.

In some embodiments, the apparatus includes a tray including a first surface on one side of the tray and a second surface on a reverse side of the tray. The tray is configured to be used in a first configuration in which the first surface faces in a particular direction and a second configuration in which the second surface faces in the particular direction. A pouch is attached to the tray and configured to receive and secure a device to the tray.

These and other aspects, features, and implementations can be expressed as methods, apparatus, systems, components, means, or steps for performing a function, and in other ways.

These and other aspects, features, and implementations will become apparent from the following descriptions, including the claims.

DETAILED DESCRIPTION

A tray apparatus is disclosed. The apparatus may be placed on a lap of a user or fastened around a torso or a waist of a user who is sitting on a chair, a car seat, a seat in an airplane, a bench, a bed, or any other furniture that can support a seated user. The apparatus includes a tray having a first surface and a second surface. The apparatus can be used in a first configuration in which the first surface faces the user. The first surface includes a marking board that can be marked by the user using markers. The tray can be reversed, such that the second surface faces the user in a second configuration. In the second configuration, the user can eat or drink using the second surface. The second surface includes a padding that the user can eat or drink on. The apparatus includes a pouch or bags to store electronic or other devices, toys, food, stationery, etc., for the use of the user.

Among other benefits and advantages of the embodiments disclosed, the apparatus engages a user with useful and creative activities. The padding of the second surface provides physical comfort to a user when the apparatus is placed on a lap of the user. The second surface may include an antimicrobial coating that prevents spread and growth of germs, bacteria, fungus, or mold. The antimicrobial coating can also prevent staining, odors, or degradation of the material of the apparatus. The pouch can hold an electronic device to provide entertainment to the user when the user is eating or drinking. A transparent or translucent side of the pouch permits haptic input from a user to pass through the side of the pouch to a touch-sensitive screen of the electronic device such that the user can control the electronic device through the pouch. When the apparatus is used in the first configuration, markers can be used to mark the marking board to provide an educational activity for the user to engage in. The apparatus reduces boredom for the user at home or on long journeys by car, airplane, or public transit. The apparatus also provides benefits to a parent or caregiver of a child using the apparatus when the parent is engaging in a task or driving, by engaging the child or providing a play opportunity to the child. In this manner, the apparatus provides the user with comfort, entertainment, a learning opportunity, and a place to eat and play, while preventing boredom.

Perspective View of Tray Apparatus

Figure 1A:
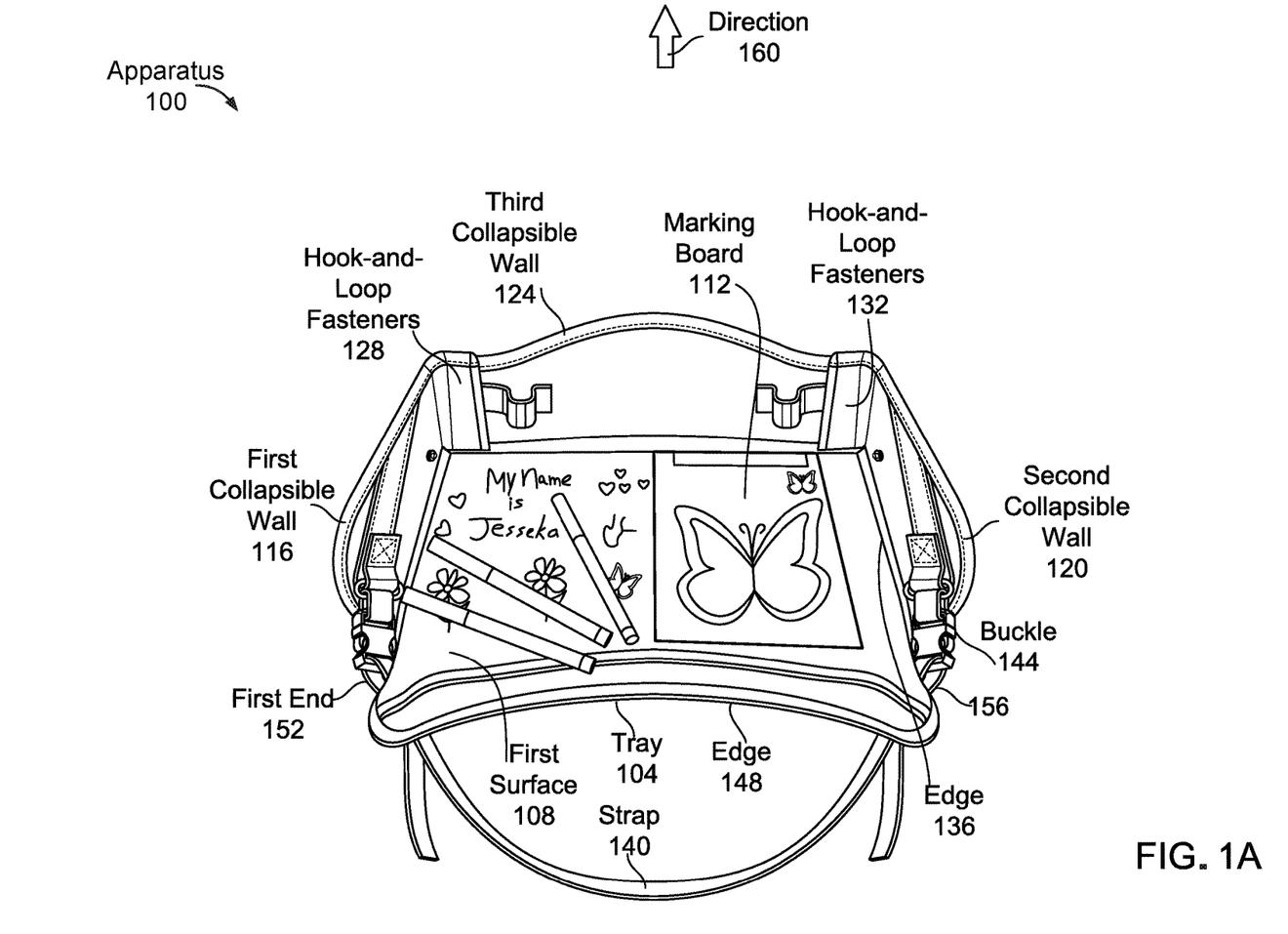
FIG. 1A shows a perspective view of a tray apparatus configured in a first configuration, in accordance with one or more embodiments.

FIG. 1A shows a perspective view of a tray apparatus 100 configured in a first configuration, in accordance with one or more embodiments. Among other components and parts, the apparatus 100 includes a tray 104, a first surface 108 of the tray 104, a marking board 112, a first collapsible wall 116, a second collapsible wall 120, a third collapsible wall 124, hook-and-loop fasteners 128, hook-and-loop fasteners 132, a strap 140, and a buckle 144.

Figure 2A:
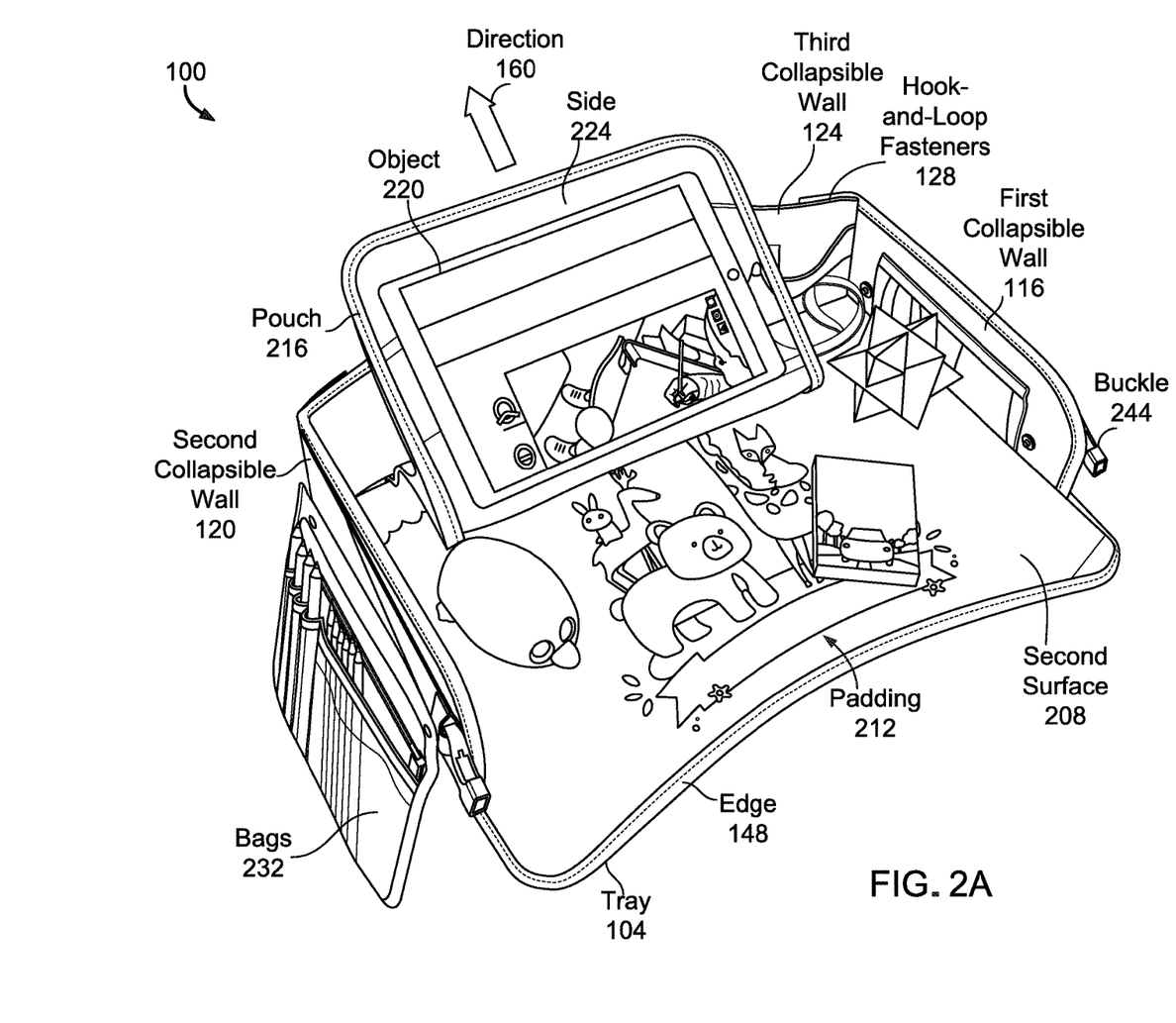
FIG. 2A shows a perspective view of the tray apparatus configured in a second configuration, in accordance with one or more embodiments.

The apparatus 100 includes the tray 104, as illustrated in FIG. 1. The tray 104 can be made of plastic, metal, stiff cardboard, wood, plywood, medium-density fiberboard (MDF), engineered wood, or any other material capable of being fashioned into a tray. The tray 104 includes the first surface 108. The apparatus 100 can be used in a first configuration as shown in FIG. 1 with the first surface 108 facing a user in the direction 160. The tray 104 is meant to be placed on a lap of the user or secured around a waist or a torso of the user. In some embodiments, the tray 104 is a reversible tray. The tray 104 can be reversed or flipped to be configured in a second configuration. In the second configuration, a second surface (e.g., second surface 208 illustrated and described below with reference to FIG. 2) of the tray 104 faces the user in the direction 160. In the second configuration, the first surface 108 faces away from the user.

The tray 104 is sized to be placed on a lap of the user and fit around a torso or a waist of the user. In some embodiments, the tray 104 is sized to be attached to a car seat or airplane seat while the user is sitting in the car seat or airplane seat. The tray 104 is sized such that an area of the first surface 108 of the tray 104 is large enough to accommodate the marking board 112. In some embodiments, the tray 104 is wide enough to allow the user to rest his or her arms on the tray 104. In some embodiments, the tray 104 is rectangular in shape with rounded corners. In some embodiments, the tray 104 is square or quadrilateral in shape. In some embodiments, an edge (e.g., edge 136) of the tray 104 is curved. The edge 148 of the tray 104 facing the user is curved to accommodate a shape of the waist or torso of the user.

The first surface 108 of the tray 104 includes the marking board 112. The marking board 112 may be embedded on or attached to the first surface 108. The marking board 112 includes a surface configured to be marked by crayons, pencils, pens, markers or similar devices used to imprint markings onto a surface. In some embodiments, the marking board 112 is a whiteboard embedded onto the first surface 108. In some embodiments, the marking board 112 can be a piece of cardboard or a writing pad that can be written on by pens, pencils, or markers. In some embodiments, the marking board 112 is a chalkboard that can be written on using chalk. In some embodiments, the first surface 108 is sized to accommodate sheets of paper that can be written on or marked by the user. In some embodiments, the marking board 112 includes multiple portions, each portion having a different writing or marking surface such as those described here.

The apparatus 100 includes three collapsible walls: a first collapsible wall 116, a second collapsible wall 120, and a third collapsible wall 124. The three collapsible walls form a border of the tray 104. Each collapsible wall can be made of plastic, cotton, a fabric, or a synthetic material such as polyester. In some embodiments, the collapsible walls and the tray 104 can be made of the same material. The first collapsible wall 116 faces the second collapsible wall 120 and is on an opposite side of the tray 104 from the second collapsible wall 120 as shown in FIG. 1. The third collapsible wall 124 extends along an edge of the tray 104 between the first collapsible wall 116 and the second collapsible wall 120. The third collapsible wall 124 can be attached to the first collapsible wall 116 using the hook-and-loop fasteners 128, a zipper, or buttons. The third collapsible wall 124 can be attached to the second collapsible wall 120 using the hook-and-loop fasteners 132, a zipper, or buttons. The hook-and-loop fasteners 128 and 132 (also referred to as hook-and-pile fasteners or touch fasteners) include lineal fabric strips (or patches), which are attached (sewn or otherwise adhered) to the opposing surfaces to be fastened. A first strip or patch includes tiny hooks and the second strip or patch includes tiny loops. When the two strips or patches are pressed together, the hooks catch in the loops, and the collapsible walls fasten or bind temporarily to each other.

The tray has four edges (including edge 148 and edge 136). Each collapsible wall of the three collapsible walls is attached to the tray 104 at a corresponding edge of the four edges. For example, the second collapsible wall 120 is attached to the tray 104 at the edge 136. Each collapsible wall may be permanently attached to the tray 104 or attached to the tray 104 using hook-and-loop fasteners, a zipper, or buttons. In either the first configuration or the second configuration, each collapsible wall can be locked to be at an angle (for example, a right angle or an angle ranging between 90° and less than 180°) with a respective edge of the tray 104.

With each collapsible wall (e.g., the second collapsible wall 120) locked at an angle relative to the corresponding edge (e.g., the edge 136) of the tray 104, objects or food placed on a surface of the tray 104 are secured or prevented from sliding off the tray 104. Each collapsible wall can be made of plastic, cotton, a fabric, or a synthetic material such as polyester.

In some embodiments, the apparatus 100 includes the strap 140. The strap 140 is configured to secure the tray 104 or the apparatus 100 to an object. For example, the strap 140 may be used to secure the tray 104 to a torso or a waist of a user using the apparatus 100 in the first or second configuration. The strap 140 can be made of plastic, cotton, fabric, a synthetic material such as polyester, or any other material capable of securing the tray to an object. A first end 152 of the strap 140 is attached to the first collapsible wall 116 of the tray 104. A second end 156 of the strap 140 is attached to the second collapsible wall 120 of the tray 104. Each of the first end 152 and the second end 156 of the strap 140 can be attached to a collapsible wall of the tray 104 using a buckle (e.g., the buckle 144), hook-and-loop fasteners, or hook-and-loop tape. When the apparatus 100 is not in use, the strap 140 may be used to secure the tray 104 to a back of a chair or another object for storage.

Figure 1B:
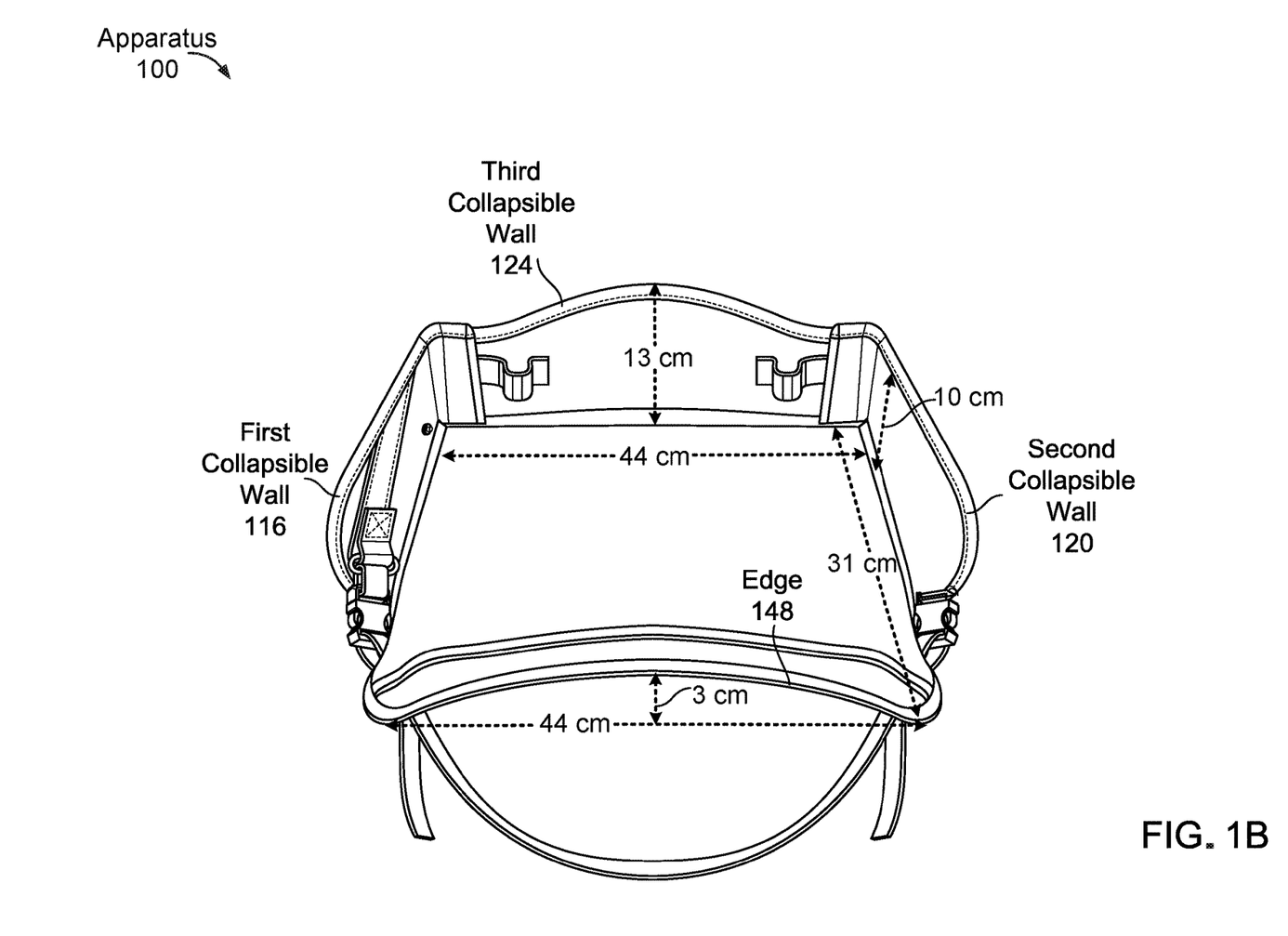
FIG. 1B shows a perspective view of a tray apparatus configured in a first configuration, in accordance with one or more embodiments.

FIG. 1B shows a perspective view of a tray apparatus 100 configured in a first configuration, in accordance with one or more embodiments. A height of each of the first collapsible wall 116 and the second collapsible wall 120 is 10 cm. A height of the third collapsible wall 124 is 13 cm. In other embodiments, each collapsible wall can have a different height. A length of each of the first collapsible wall 116 and the second collapsible wall 120 is 31 cm. A length of the third collapsible wall is 44 cm. In other embodiments, each collapsible wall can have a different length. The edge 148 is curved by 3 cm to accommodate a stomach or torso of a user.

Perspective View of Tray Apparatus

FIG. 2A shows a perspective view of the tray apparatus 100 configured in the second configuration, in accordance with one or more embodiments. Among other components and parts, the apparatus 100 includes the tray 104, the second surface 208 of the tray 104, a padding 212, the first collapsible wall 116, the second collapsible wall 120, the third collapsible wall 124, hook-and-loop fasteners 128, a buckle 244, a pouch 216, and bags 232.

The apparatus 100 can be reversed or flipped from the first configuration (illustrated and described above with reference to FIG. 1) to configure the apparatus 100 in the second configuration. To reverse or flip the apparatus 100, the three collapsible walls are unfastened from each other using the hook-and-loop fasteners 128 and 132, zippers, or buttons. When the apparatus 100 is reversed or flipped, each of the three collapsible walls of the apparatus 100 are also reversed or flipped. In the second configuration, the three collapsible walls are refastened to each other using the hook-and-loop fasteners 128 and 132, zippers, or buttons.

The tray 104 includes the second surface 208 (on a reverse side of the first surface 108), as illustrated in FIG. 2. The apparatus 100 can be used in the second configuration as shown in FIG. 2 with the second surface 208 facing a user in the direction 160 and the first surface 108 facing away from the user. The curved edge 148 of the tray 104 faces the user in the second configuration. The tray 104 is sized such that an area of the second surface 208 of the tray 104 is large enough to accommodate the padding 212. The tray 104 is further sized such that an area of the second surface 208 is large enough for the user to eat on. The tray 104 is further sized such that an area of the second surface 208 is large enough to accommodate an object such as object 220, a tablet computer, a smartphone, a personal device such as a PDA, a book, or a magazine of the user.

The second surface 208 includes the padding 212, which may be embedded in or attached to the second surface 208. The padding 212 may include cotton, a fabric, a synthetic material such as polyester, or any other material capable of being used to pad the second surface 208. In some embodiments, the padding 212 is made of a waterproof material such as plastic or a synthetic to protect the second surface 208 and the apparatus 100 from spilled food or liquids. In the second configuration, the user can eat or drink on the second surface 208 while watching a program on or interacting with (e.g., playing a game on) an electronic device such as object 220. In some embodiments, the user can eat or drink on the second surface 208 while reading a book or magazine or listening to music. In some embodiments, the second surface 208 is covered with an antimicrobial coating to prevent the spread or growth of germs, bacteria, fungus, or mold. The antimicrobial coating can also prevent staining, odors, or degradation of the material of the second surface 208. The antimicrobial coating can be made of a polymer or a peptide. In the first configuration (illustrated and described above with reference to FIG. 1), when the tray 104 is placed on a lap of the user, the padding 212 provides physical comfort to the lap or legs of the user.

The pouch 216 is attached to the tray 104 to receive and secure the object 220 or a device to the tray 104. The pouch 216 may be made of plastic, cotton, a fabric, a synthetic material such as polyester, or any other material capable of being fashioned into the pouch 216. In some embodiments, the pouch 216 is made of a waterproof material, such as plastic to prevent food or liquids from contacting or falling on the object 220 secured by the pouch 216. In some embodiments, a portion of the pouch 216 is made of a material that can be stretched to accommodate larger objects. The pouch 216 can be permanently sewn on to the tray 104 or attached to the tray 104 using hook-and-loop fasteners, a zipper, buttons, or hook-and-loop tape.

The pouch 216 is configured to receive and secure the object 220. In some embodiments, the object 220 is an electronic device, such as a tablet computer, a smartphone, or any other device having an electronic display. In some embodiments, the object 220 is a magazine, a book, or a toy. The pouch 216 has at least one transparent or translucent side 224 facing the user in the direction 160. In some embodiments, the transparent or translucent side 224 of the pouch 216 faces away from a collapsible wall (e.g., the third collapsible wall 124) of the tray 104. The transparent or translucent side 224 faces away from the collapsible wall and towards the user to allow the user to view an electronic display screen of the object 220 within the pouch 216. In this manner, the user can watch a program or video on the electronic display screen of the object 220.

In some embodiments, the pouch 216 is configured to transmit a haptic input to a device or the object 220 through the transparent or translucent side 224 of the pouch 216. For example, if the object 220 secured by the pouch 216 is a tablet computer, gaming device or smartphone, a user or parent may provide touch input or haptic input to a touchscreen of the object 220 through the transparent or translucent side 224 of the pouch 216. In some embodiments, the pouch 216 includes one or more pockets to secure small objects or toys.

In some embodiments, the apparatus 100 includes one or more bags 232 attached to one or more collapsible walls of the tray 104 using hook-and-loop fasteners, a zipper, or buttons. For example, the bags 232 can be attached to the second collapsible wall 120 as illustrated in FIG. 2, to the third collapsible wall 124, or to the first collapsible wall 116. The bags 232 are configured to hold one or more objects, such as food cups, pens, pencils, crayons, tissues, erasers, markers, toys, keys, etc. The bags 232 can be made of cotton, polyester, any other synthetic material, or plastic. In some embodiments, the bags 232 are made of a material that can be stretched to accommodate larger objects. The bags 232 can be permanently sewn on to the first collapsible wall 116 or attached to the first collapsible wall 116 using hook-and-loop fasteners, a zipper, or buttons.

The strap 140 (illustrated and described above with reference to FIG. 1) can be attached to the first collapsible wall 116 of the tray 104 using the buckle 244.

Figure 2B:
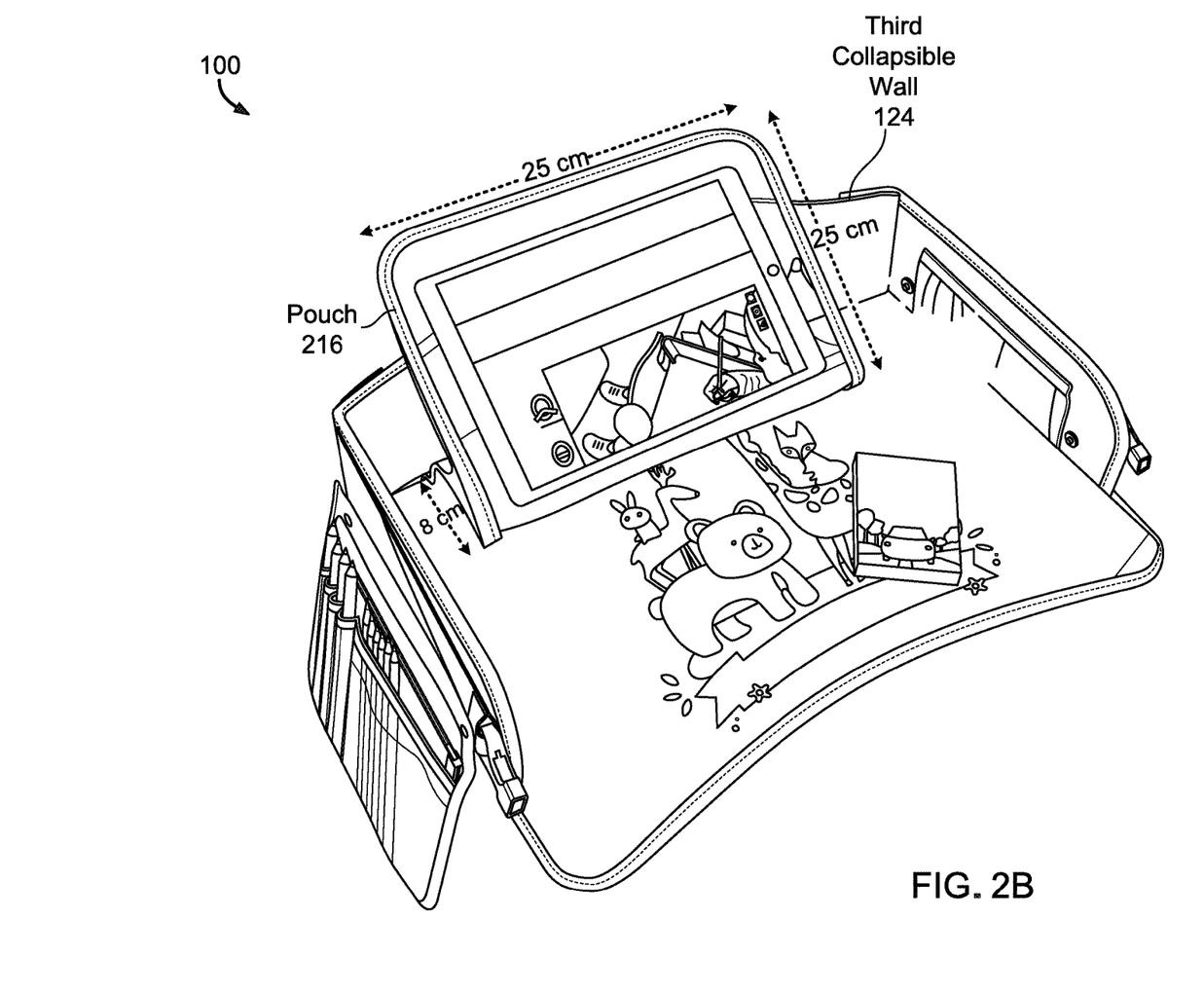
FIG. 2B shows a perspective view of the tray apparatus configured in a second configuration, in accordance with one or more embodiments.

FIG. 2B shows a perspective view of the tray apparatus 100 configured in the second configuration, in accordance with one or more embodiments. A length of the pouch 216 is 25 cm. A height of the pouch 216 is 25 cm. In other embodiments, the pouch 216 has different dimensions. The pouch 216 is inclined or angled such that a bottom edge of the pouch 216 is spaced 8 cm from a bottom edge of the third collapsible wall 124. In other embodiments, the bottom edge of the pouch 216 is spaced differently from the bottom edge of the third collapsible wall 124.

Process for Operating the Tray Apparatus

FIGS. 3A-F illustrate a process for operating the tray apparatus 100, in accordance with one or more embodiments. The process illustrated in FIGS. 3A-F is meant to reverse or flip the apparatus 100 from the first configuration for use in the second configuration.

Figure 3A:
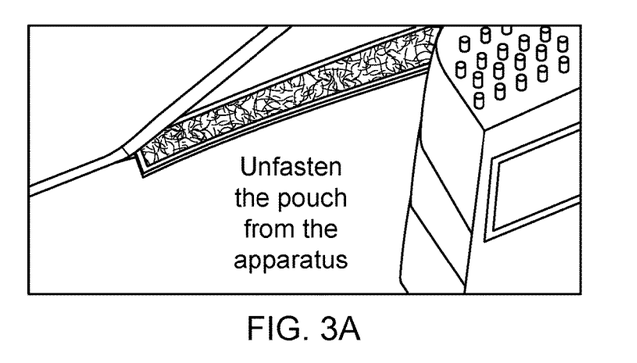
FIGS. 3A-F illustrate a process for operating the tray apparatus, in accordance with one or more embodiments.

In FIG. 3A, the apparatus 100 is being used in the first configuration. The first surface 108 of the tray 104 is facing a user of the apparatus 100. The user can mark the marking board 112 in the first configuration. In FIG. 3A, the pouch 216 is unfastened from the apparatus 100 using hook-and-loop fasteners, a zipper, or buttons.

Figure 3B:
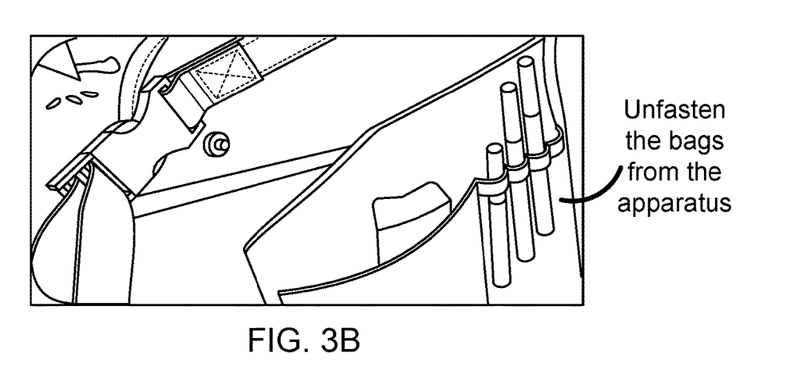

In FIG. 3B, the one or more bags 232 are unfastened from the apparatus 100 using hook-and-loop fasteners, a zipper, or buttons. The bags 232 are configured to secure and hold one or more objects, such as toys, pens, pencils, markers, or food.

Figure 3C:
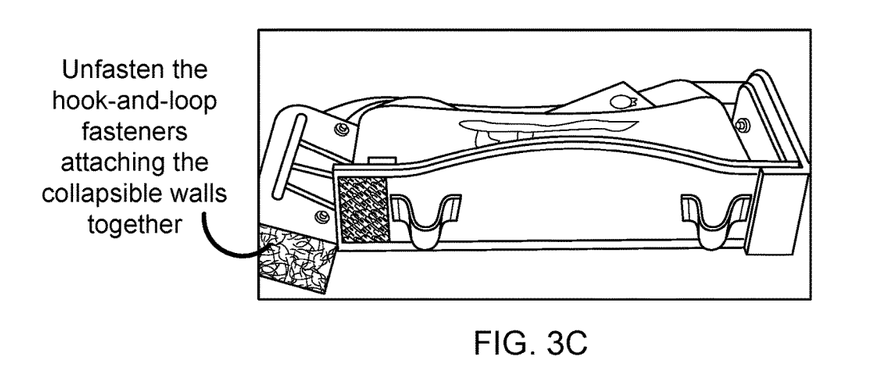

In FIG. 3C, the three collapsible walls (e.g., the first collapsible wall 116, second collapsible wall 120, and third collapsible wall 124) are unfastened from each other, such that the apparatus 100 can be reversed or flipped. The three collapsible walls provide a border for the tray 104 such that objects placed on the tray 104 are prevented from sliding off or falling off the tray 104.

Figures 3D, 3E:
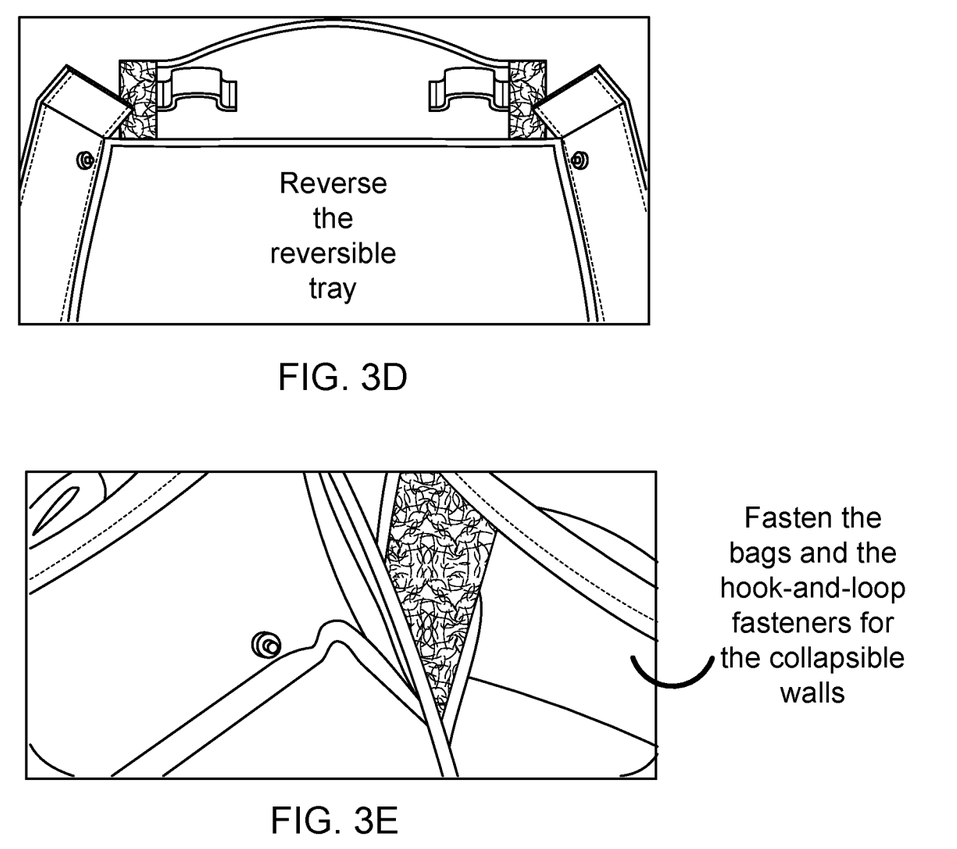

In FIG. 3D, the apparatus 100 is reversed or flipped to prepare the apparatus 100 to be used in the second configuration. In the second configuration, the second surface 208 is facing the user in the direction 160. The user can eat on or watch a screen of the object 220 secured in the pouch 216 in the second configuration.

In FIG. 3E, the one or more bags 232 are fastened to the apparatus 100 using hook-and-loop fasteners, a zipper, or buttons such that a toy or food stored in the bags 232 can be extracted by the user.

Figure 3F:
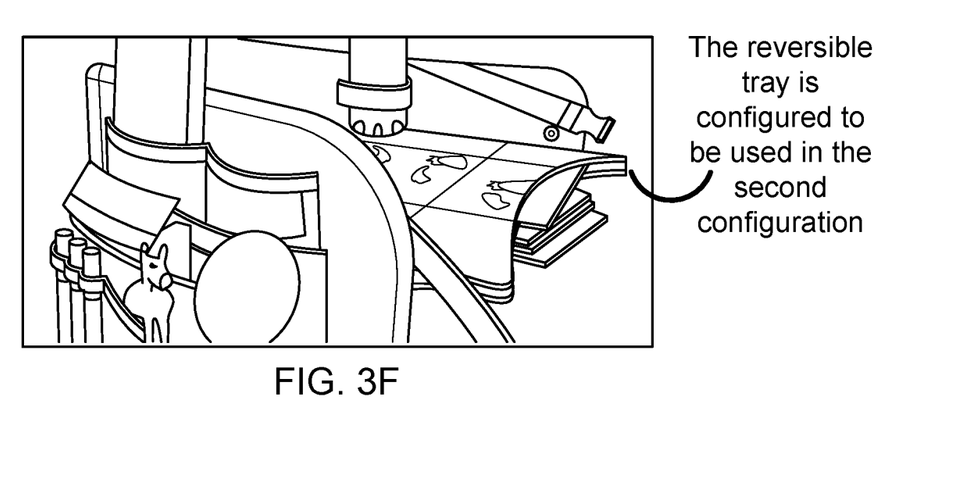

In FIG. 3F, the pouch 216 is reattached to the apparatus 100 using hook-and-loop fasteners, a zipper, or buttons. The three collapsible walls are re-attached to each other, such that the apparatus 100 can be used in the second configuration.

What is claimed is:

1. An apparatus comprising:
 a reversible tray comprising:

four edges;
a first surface comprising a marking board, wherein the reversible tray is configured to be used in a first configuration of the apparatus in which the first surface faces a user in a particular direction; and
a second surface on a reverse side of the reversible tray and comprising a padding, wherein the reversible tray is further configured to be used in a second configuration of the apparatus in which the second surface faces the user in the particular direction;
three collapsible walls, wherein each collapsible wall of the three collapsible walls is attached to the reversible tray at a corresponding edge of the four edges, and wherein the three collapsible walls are (a) attached to each other when the tray is in the first configuration and (b) configured to be unfastened, flipped, and reattached to each other to reverse the apparatus to the second configuration; and
a pouch configured to be unfastened from the reversible tray when the apparatus is in the first configuration and attached to the reversible tray to face the user when the apparatus is in the second configuration, the pouch configured to receive and secure an object to the reversible tray.

2. The apparatus of claim 1, further comprising a strap configured to secure the reversible tray to an object, wherein a first end of the strap is attached to a first collapsible wall of the three collapsible walls and a second end of the strap is attached to a second collapsible wall of the three collapsible walls.

3. The apparatus of claim 2, wherein the pouch comprises a transparent or translucent side and the object that the pouch is configured to receive and secure is a device having an electronic display, and wherein the pouch is inclined and the transparent or translucent side faces the user and away from a third collapsible wall of the three collapsible walls when the apparatus is in the second configuration with the pouch attached to the reversible tray.

4. The apparatus of claim 3, wherein the third collapsible wall is attached to the first collapsible wall and the second collapsible wall using hook-and-loop fasteners.

5. The apparatus of claim 1, wherein the pouch is attached to the reversible tray using hook-and-loop fasteners.

6. The apparatus of claim 1, wherein the marking board is a whiteboard configured to be marked by whiteboard markers.

7. The apparatus of claim 1, further comprising one or more fabric bags or plastic bags configured to be attached to one or more collapsible walls of the reversible tray using hook-and-loop fasteners when the apparatus is in the first configuration and to hold one or more objects, and further configured to be unfastened and reattached to the one or more collapsible walls upon reversal of the apparatus to the second configuration.

8. The apparatus of claim 1, wherein the padding comprises a waterproof material.

9. The apparatus of claim 1, wherein the second surface is covered by an antimicrobial coating.

10. The apparatus of claim 1, wherein the pouch is further configured to transmit a haptic input to the object through the pouch.

11. The apparatus of claim 1, wherein the pouch comprises a waterproof material.

12. An apparatus comprising:
a tray comprising four edges and a first surface on one side of the tray and a second surface on a reverse side of the tray, wherein the tray is configured to be used in a first configuration of the apparatus in which the first surface faces a user in a particular direction and a second configuration of the apparatus in which the second surface faces the user in the particular direction;
three collapsible walls, wherein each collapsible wall of the three collapsible walls is attached to the tray at a corresponding edge of the four edges, and wherein the three collapsible walls are (a) attached to each other when the tray is in the first configuration and (b) configured to be unfastened, flipped, and reattached to each other to reverse the apparatus to the second configuration; and
a pouch configured to receive and secure a device and configured to be (a) unfastened from the tray when the apparatus is in the first configuration and (b) attached to the tray when the apparatus is in the second configuration such that the device faces the user.

13. The apparatus of claim 12, wherein the first surface comprises a marking board configured to be marked by whiteboard markers.

14. The apparatus of claim 12, wherein the pouch is attached to the tray using a hook-and-loop fastener, and wherein the pouch has a transparent or translucent side facing away from a collapsible wall of the tray.

15. The apparatus of claim 12, further comprising one or more fabric bags or plastic bags attached to one or more collapsible walls of the tray and configured to hold one or more objects.

16. The apparatus of claim 12, wherein the second surface comprises a waterproof padding.

17. The apparatus of claim 12, wherein the second surface is covered by an antimicrobial coating.

18. The apparatus of claim 12, wherein the pouch is further configured to transmit a haptic input from the user to the device through the pouch.

19. The apparatus of claim 12, further comprising a strap configured to secure the tray to an object, wherein a first end of the strap is attached to a first collapsible wall of the three collapsible walls and a second end of the strap is attached to a second collapsible wall of the three collapsible walls.

20. The apparatus of claim 12, wherein the pouch comprises a transparent or translucent side and the object the pouch is configured to receive and secure is a device having an electronic display, and wherein the pouch is inclined and the transparent or translucent side faces the user when the apparatus is in the second configuration with the pouch attached to the reversible tray.

* * * * *